(12) United States Patent
Ramle et al.

(10) Patent No.: US 10,917,867 B2
(45) Date of Patent: Feb. 9, 2021

(54) OPTIMIZED HANDLING OF A UE IN MICO MODE WITH ENTIRE PLMN AS REGISTRATION AREA

(71) Applicant: Telefonaktiebolaget LM Ericsson (publ), Stockholm (SE)

(72) Inventors: Peter Ramle, Mölnlycke (SE); Qian Chen, Mölndal (SE); Josefin Karlsson, Torslanda (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/492,279

(22) PCT Filed: Dec. 22, 2017

(86) PCT No.: PCT/EP2017/084326
§ 371 (c)(1),
(2) Date: Sep. 9, 2019

(87) PCT Pub. No.: WO2018/162111
PCT Pub. Date: Sep. 13, 2018

(65) Prior Publication Data
US 2020/0389864 A1    Dec. 10, 2020

Related U.S. Application Data

(60) Provisional application No. 62/469,074, filed on Mar. 9, 2017.

(51) Int. Cl.
*H04W 60/00* (2009.01)
*H04W 76/27* (2018.01)
*H04W 8/08* (2009.01)

(52) U.S. Cl.
CPC ............. *H04W 60/00* (2013.01); *H04W 8/08* (2013.01); *H04W 76/27* (2018.02)

(58) Field of Classification Search
CPC ........ H04W 76/27; H04W 60/00; H04W 8/08
See application file for complete search history.

(56) References Cited

FOREIGN PATENT DOCUMENTS

WO    2011/098046 A1    8/2011

OTHER PUBLICATIONS

International Search Report and Written Opinion dated Mar. 22, 2018 issued in International Application No. PCT/EP2017/084326. (11 pages).

(Continued)

*Primary Examiner* — Nam T Huynh
(74) *Attorney, Agent, or Firm* — Rothwell, Figg, Ernst & Manbeck, P.C.

(57) ABSTRACT

A UE is configured such that, when in MICO mode, the UE does not transmit certain messages (e.g., Service Request, periodic registration update message) whenever there is a risk that the certain message will not be routed to the UE's serving AMF. In some embodiments, the network (e.g., serving AMF) indicates to the UE in MICO mode an area (parts of, or the entire PLMN) that is covered by the serving AMF, the Within Serving AMF (WSA) area. While the UE is within the indicated WSA area, the UE in MICO mode may continue to use periodic registration area update or Service Requests (instead of the more extensive mobility registration update procedure) as there is no risk of addressing a new AMF in that area.

20 Claims, 11 Drawing Sheets

(56) References Cited

OTHER PUBLICATIONS

International Preliminary Report on Patentability dated Feb. 11, 2019 issued in International Application No. PCT/EP2017/084326. (17 pages).
3GPP TS 23.501 V0.3.0 (Feb. 2017); 3rd Generation Partnership Project; Technical Specification Group Services and System Aspects; System Architecture for the 5G System; Stage 2 (Release 15) (Feb. 2017). (97 pages).
3GPP TS 23.502 V0.2.0 (Feb. 2017); 3rd Generation Partnership Project; Technical Specification Group Services and System Aspects; Procedures for the 5G System; Stage 2 (Release 15) (Feb. 2017). (71 pages).
3GPP TR 23.799 V14.0.0 (Dec. 2016); 3rd Generation Partnership Project; Technical Specification Group Services and System Aspects; Study on Architecture for Next Generation System (Release 14) (Dec. 2016). (522 pages).
Ericsson, "MICO mode updates", SA WG2 Meeting #120; S2-171689; Busan, Korea (Mar. 2017). (5 pages).

OPTIMIZED HANDLING OF A UE IN MICO MODE WITH ENTIRE PLMN AS REGISTRATION AREA

CROSS REFERENCE TO RELATED APPLICATION(S)

This application is a 35 U.S.C. § 371 National Stage of International Patent Application No. PCT/EP2017/084326, filed Dec. 22, 2017, designating the United States and claiming priority to U.S. provisional application No. 62/469,074, filed on Mar. 9, 2017. The above identified applications are incorporated by reference.

TECHNICAL FIELD

Disclosed are embodiments related to handling a user equipment (UE) in Mobile Initiated Connection Only (MICO) mode.

BACKGROUND

The concept of Mobile Initiated Connection Only (MICO) mode is described in 3GPP TS 23.501 v0.3.0 clause 5.4.1.3. In short, a UE in MICO mode does not need to listen to paging because it is only the UE that initiates communications with the network such that mobile terminated (MT) data/signaling is only possible when the connection, on initiative from the UE, is already set up (i.e., when the UE is in CM-CONNECTED state).

A UE (i.e., a device capable of wireless communication, such as, for example, a smartphone or a mobile Internet-of-Things (IoT) device) may indicate a preference for MICO mode during initial registration or registration update. The Access and Mobility Management Function (AMF) serving the UE (the "serving AMF"), based on one or more of a local configuration, UE indicated preferences, UE subscription information, and network policies, determines whether MICO mode is allowed for the UE, and the AMF indicates to the UE during the registration procedure whether MICO mode is allowed for the UE. The UE and core network re-initiates or exits the MICO mode at subsequent registration signaling. If MICO mode is not indicated explicitly in Registration, then both the UE and the AMF shall not use the MICO mode.

For UEs that prefer to operate in MICO mode it is possible that the UE will be assigned a registration area that encompasses an entire PLMN ("all PLMN"). As explained in TS 23.501, "[a serving] AMF assigns a registration area to the UE during the registration procedure. When the AMF indicates MICO mode to a UE, the registration area is not constrained by paging area size. The network, based on local policy, and subscription information, may decide to provide an 'all PLMN' registration area indication to the UE. In that case, re-registration to the same PLMN due to mobility does not apply."

SUMMARY

When a serving AMF assigns to a UE in MICO mode an "all PLMN" registration area, it is possible that the serving AMF does not cover the entire PLMN. In such a scenario, when the UE is located in an area not served by the serving AMF, control plane messages (e.g., registration update messages and other control plane messages) transmitted by the UE may not be routed to the UE's serving AMF. This is not a problem for certain control plane messages (e.g., mobility registration updates), but for message like periodic registration update and Service Requests it means (with legacy behavior) that the request will be rejected and the UE is required to re-register (reattach in legacy). As a consequence, more signaling is added resulting in increased latency and power consumption in the UE. The latter being troublesome for low energy devices. A more detailed explanation of the problem is included in the draft change request attached as Appendix A to U.S. provisional application No. 62/469,074, filed on Mar. 9, 2017, the relevant portions of which are included at the end of this document.

To avoid the above described problem, the UE should be configured such that, when in MICO mode, the UE does not transmit certain messages (e.g., Service Request, periodic registration update message) whenever there is a risk that the certain message will not be routed to the UE's serving AMF. Accordingly, in some embodiments the network (e.g., serving AMF) indicates to the UE in MICO mode an area (parts of, or the entire PLMN) that is covered by the serving AMF, the Within Serving AMF (WSA) area. While the UE is within the indicated WSA area, the UE in MICO mode may continue to use periodic registration area update or Service Requests (instead of the more extensive mobility registration update procedure) as there is no risk of addressing a new AMF in that area.

For example, in some embodiments, a UE in MICO mode with a registration area encompassing the whole PLMN shall use the registration procedure as specified in TS 23.502 clause 4.2.2.2.2 whenever the UE wants to initiate connection with the core network and when there is a risk of addressing a new AMF. Additionally, in some embodiments, a UE in MICO mode with a registration area encompassing the whole PLMN shall be provided with a Within Serving AMF (WSA) area indicating parts of the PLMN in which the periodic registration area update and the Service Request procedures are possible to use. In some embodiments, the WSA area consists of or comprises a list of TAs within the PLMN or alternatively defines the whole PLMN for cases when the service area of the serving AMF is the whole PLMN.

Accordingly, in one aspect there is provided a method performed by a UE. In some embodiments the method includes: (1) the UE transmitting a first access network (AN) message comprising a first registration request comprising registration type information indicating that the UE wants to perform an initial registration or a registration update; (2) the UE receiving a registration accept that is responsive to the registration request, wherein the registration accept was transmitted by a serving AMF and comprises first information indicating that a Mobile Initiated Connection Only, MICO, mode of operation is allowed and second information indicating that the UE's registration area encompasses an entire PLMN; (3) the UE deciding to initiate a connection or perform a periodic registration update; and (4) the UE determining whether the UE is located within an area served by the serving AMF. Advantageously, the UE is configured such that: i) as a result of the UE deciding to initiate the connection and determining that the UE is not located within an area served by the serving AMF, the UE transmits a second registration request comprising registration type information indicating that the UE wants to perform a mobility registration update, and ii) as a result of the UE deciding to initiate the connection and determining that the UE is located within an area served by the serving AMF, the UE transmits towards the serving AMF a service request message.

In some embodiments, the UE is further configured such that: iii) as a result of the UE deciding to perform a periodic update and determining that the UE is not located within an area served by the serving AMF, the UE transmits a second registration request comprising registration type information indicating that the UE wants to perform a mobility registration update, and iv) as a result of the UE deciding to perform a periodic update and determining that the UE is located within an area served by the serving AMF, the UE transmits towards the serving AMF a second registration request comprising registration type information indicating that the UE wants to perform a periodic registration update (e.g., the UE is in registered state and initiates a registration procedure due to expiration of a periodic update timer).

In some embodiments, the registration accept further comprises third information indicating a Within Serving AMF (WSA) area (e.g., parts of a PLMN in which a periodic registration update and a service request procedures is possible to use). In some embodiments, the information indicating the WSA area a) comprises or consists of a set of one or more tracking area (TA) identifiers or b) indicates the entire PLMN. In some embodiments, the UE determines whether the UE is located within an area served by the serving AMF by receiving a TA identifier from a serving AN node (e.g., base station) and determining whether the TA identifier received from the serving AN node is included in the WSA area (e.g. included in the set of one or more TA identifiers).

In another embodiment, the method includes: (1) the UE transmitting a first access network (AN) message comprising a first registration request comprising registration type information indicating that the UE wants to perform an initial registration or a registration update; and (2) the UE receiving a registration accept that is responsive to the registration request, wherein the registration accept was transmitted by a serving AMF and comprises: 1) first information indicating that a Mobile Initiated Connection Only, MICO, mode of operation is allowed, 2) second information indicating that the UE's registration area encompasses an entire PLMN, and 3) third information indicating a Within Serving AMF (WSA) area (e.g., parts of a PLMN in which a periodic registration update and a service request procedures is possible to use). In some embodiments, the information indicating the WSA area a) comprises or consists of a set of one or more tracking area (TA) identifiers or b) indicates the entire PLMN. In some embodiments, the UE determines whether the UE is located within an area served by the serving AMF by receiving a TA identifier from a serving AN node (e.g., base station) and determining whether the TA identifier received from the serving AN node is included in the WSA area (e.g. included in the set of one or more TA identifiers).

In another aspect there is provided a UE comprising a receiver, a transmitter and a data processing apparatus that is configured to cause the UE to perform any one of the above described methods.

In another aspect, there is proved a method performed by an AMF. In some embodiments the method includes: (1) the AMF receiving a first message (e.g., N2 message) comprising a first registration request comprising registration type information indicating that a user equipment, UE, wants to perform an initial registration or a registration update; and (2) the AMF, transmitting towards the UE a registration accept that is responsive to the registration request, wherein the registration accept comprises: 1) first information indicating that a Mobile Initiated Connection Only, MICO, mode of operation is allowed, 2) second information indicating that the UE's registration area encompasses an entire PLMN, and 3) third information indicating a Within Serving AMF (WSA) area (e.g., parts of a PLMN in which a periodic registration update and a service request procedures is possible to use). In some embodiments, the information indicating the WSA area a) comprises or consists of a set of one or more tracking area (TA) identifiers or b) indicates the entire PLMN.

An advantage of the above described embodiments is that the benefit of using the "all PLMN" (i.e. whole PLMN) as registration area is maintained because the UE is not required to perform registration area updates during idle mode mobility in the PLMN, while the drawbacks of possible reject and re-registration from the UE is avoided and at the same time reducing the use of the more extensive registration area update procedure.

BRIEF DESCRIPTION OF THE DRAWINGS

The accompanying drawings, which are incorporated herein and form part of the specification, illustrate various embodiments.

DETAILED DESCRIPTION

Figure 1:
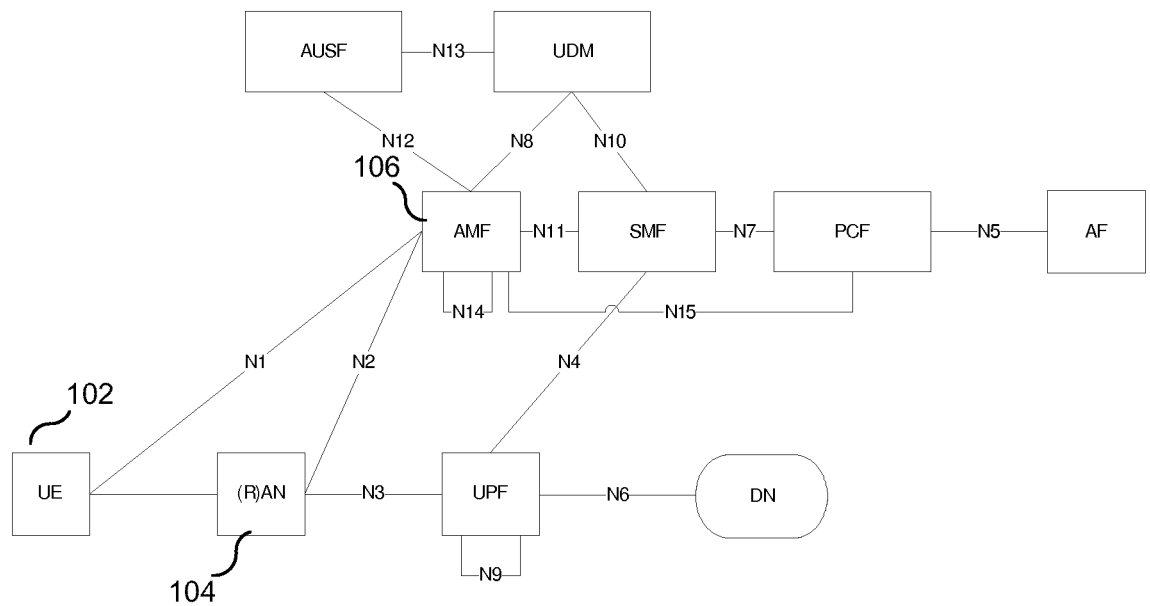
FIG. 1 illustrates a non-roaming architecture view for next generation networks, according to some embodiments.
Figure 2:
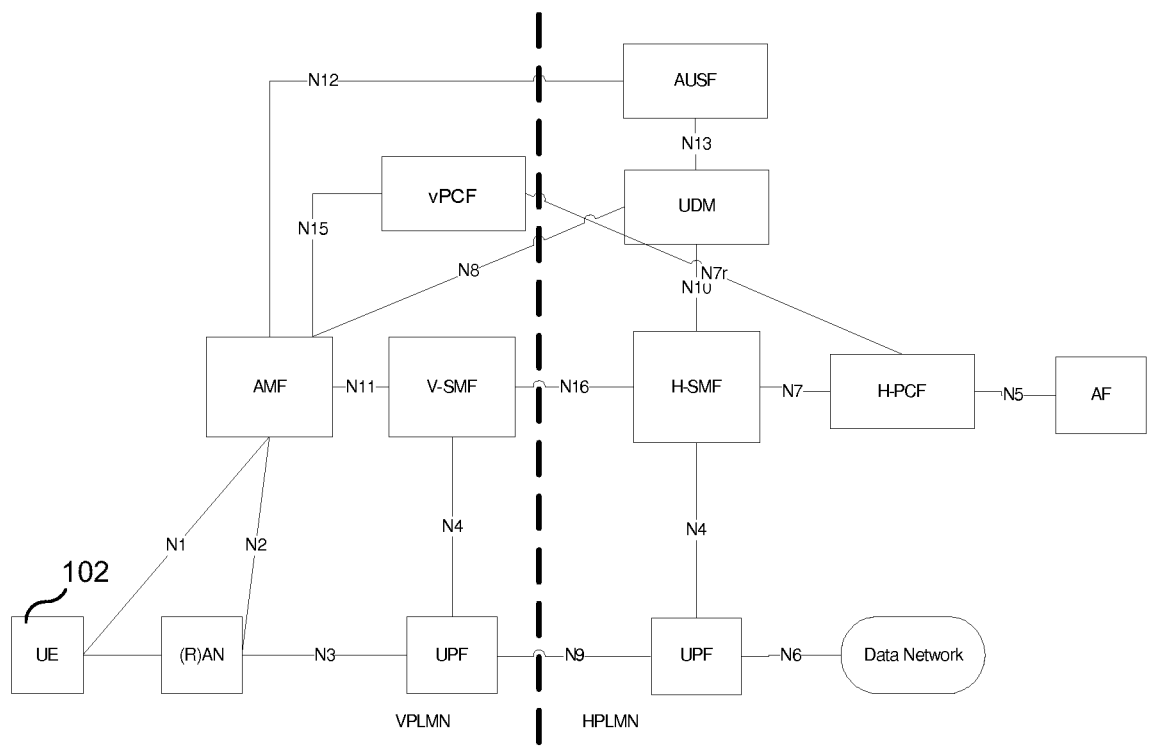
FIG. 2 illustrates a roaming (home-routed) architecture view for next generation networks, according to some embodiments.

FIG. 1 illustrates a non-roaming architecture view for next generation networks. FIG. 2 illustrates a roaming (home-routed) architecture view for next generation networks.

Referring to FIGS. 1 and 2, the Core Access and Mobility Management Function (AMF) (106) and Session Management Function (SMF) represents the control plane of the core network and has the same functionality as the control plane parts of SGSN, MME, GGSN, SGW and PGW in GERAN, UTRAN and E-UTRAN. Policy Control Function, PCF is a similar function as PCRF used for GERAN, UTRAN and E-UTRAN. Unified Data Management (UDM) is the subscription information storage including all information for the subscribers of the operator. When a subscriber connects to the network, subscription information is retrieved from UDM. In a roaming scenario, the serving operator retrieves subscription information located in the home operator's network. UDM can be seen as similar to Home Subscriber Server (HSS) or Home Location Register (HLR), the first used for LTE/EPS and the second used for GERAN and UTRAN.

Figure 3:
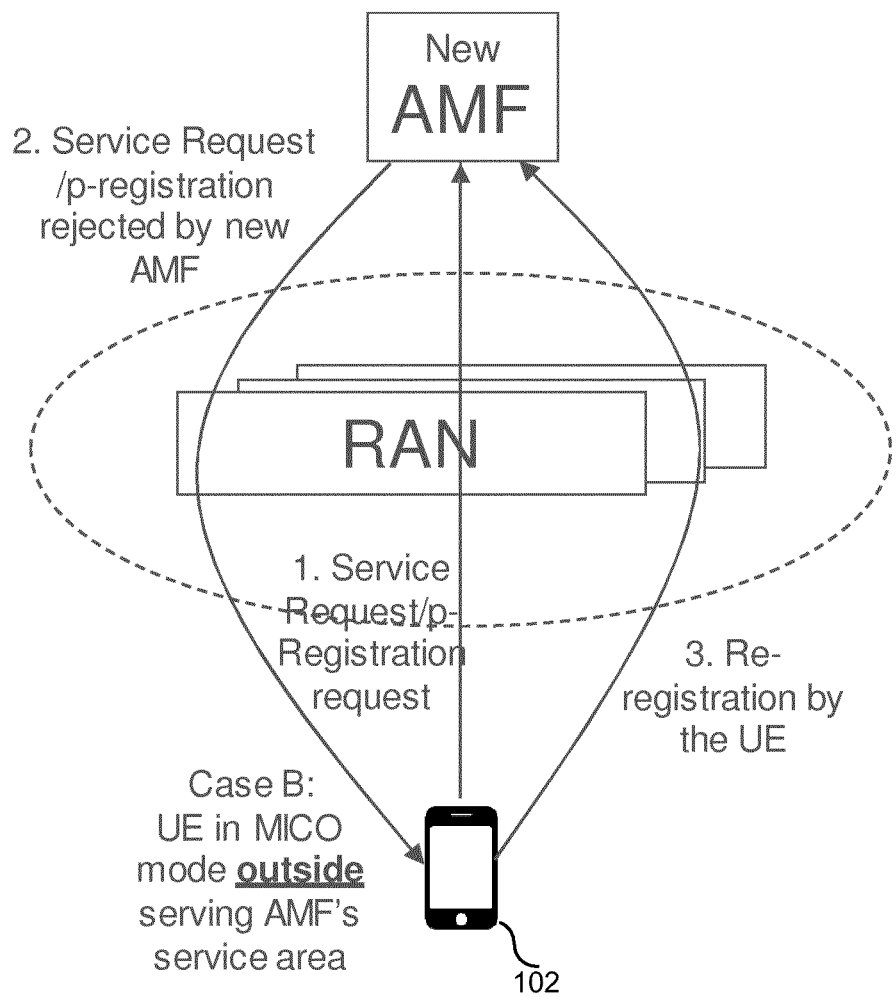
FIG. 3 is a message flow diagram illustrating an exchange of messages between a UE and an AMF.

FIG. 3 illustrates the problem described above. FIG. 3 shows a UE 102 that is operating in MICO mode and that is located within an area that is not served by the UE's serving AMF (i.e., the AMF with which the UE most recently registered), but the UE is located within its registration area. FIG. 3 further shows in step 1 the UE transmitting to the network a Service Request (or a periodic registration update message—i.e., a Registration Request with type of "periodic registration update").

In this scenario, because the UE is not located within an area served by the UE's serving AMF, the Service Request/p-reg update is routed to a new AMF. The new AMF will, however, reject the Service Request/p-reg update because the UE is not registered with the new AMF. The UE is not registered with the new AMF because the area in which the UE is located is included in the UE's registration area, hence the UE did not perform a mobility registration update when the UE entered the area served by the new AMF. That is, the UE will not initiate a registration procedure solely due to mobility as the UE moves within its registration area. Thus, in step 2 the new AMF sends to the UE a reject message. This reject message will cause the UE to send to the new AMF a registration request (e.g., a registration request with type set to a value indicating an "initial registration").

Figure 4:
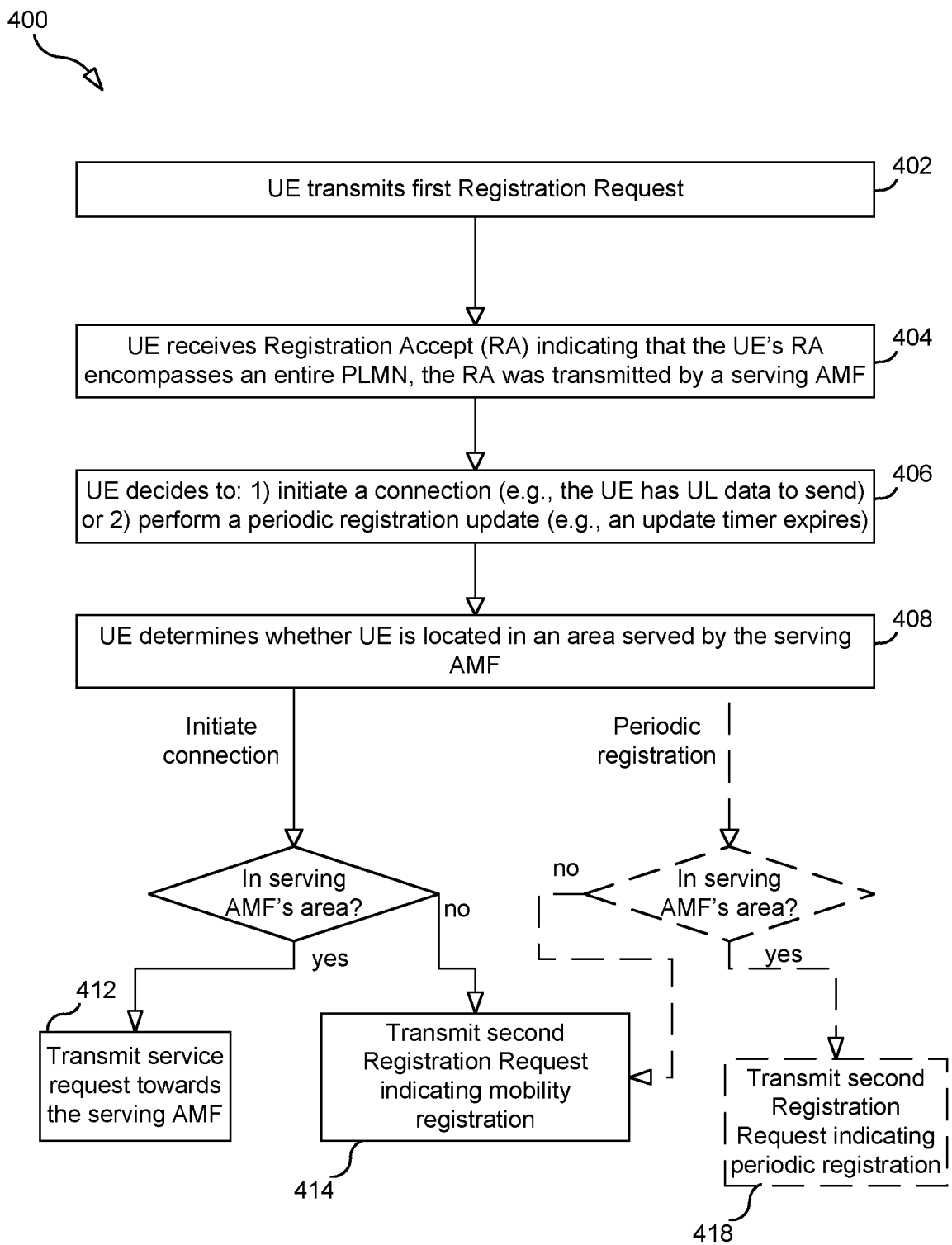
FIG. 4 is a flow chart illustrating a process according to some embodiments.
Figure 5:
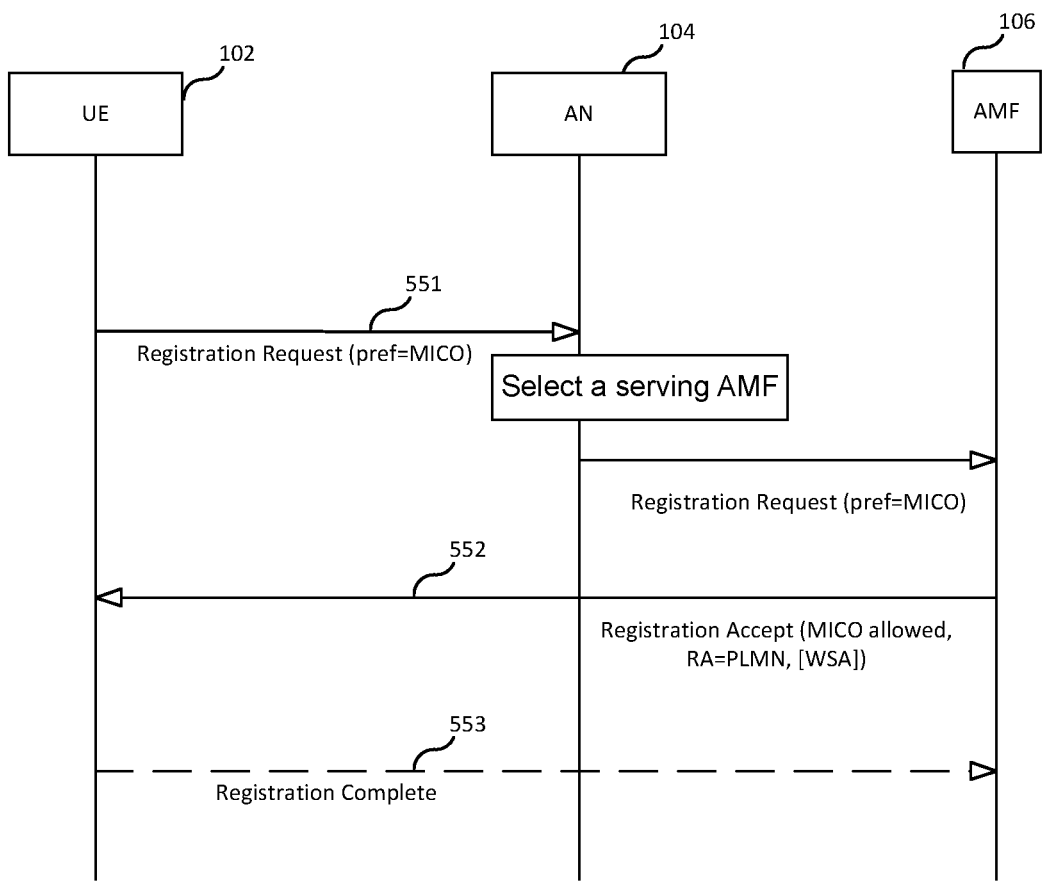
FIG. 5. is a message flow diagram illustrating an exchange of messages between a UE and an AMF.

FIG. 4 illustrates a process 400 that avoids the above described problem. Process 400 may begin in step 402, in which the UE transmits a first access network (AN) message comprising a first registration request 551 (see the message flow diagram of FIG. 5) comprising registration type information indicating that the UE wants to perform an initial registration or a registration update. The registration request may further includes information indicating that the UE is capable of and desires to operate in the MICO mode.

The first AN message comprising the first registration request 551 is received at an AN node 104 (e.g., base station) and, in response to receiving the AN message, the AN node selects an AMF (which in this example is AMF 106) and sends to the selected AMF 106 an N2 message comprising the registration request 551. The AMF 106 processes the registration request 551 and, in this case, transmits to the UE 102 a registration accept 552 that comprises first information indicating that a Mobile Initiated Connection Only, MICO, mode of operation is allowed and second information indicating that the UE's registration area encompasses an entire PLMN.

In some embodiments, the registration accept further includes information indicating a WSA area (parts of a PLMN or entire PLMN in which a periodic registration update and a service request procedures is possible to use). In some embodiments, the information indicating the WSA area a) comprises or consists of a set of one or more tracking area (TA) identifiers or b) indicates the entire PLMN.

In step 404, the UE receives the registration accept 552, which is responsive to the registration request 551. The UE may respond to the registration accept 552 by transmitting a registration complete 553.

In step 406, the UE decides to initiate a connection or perform a periodic registration update.

In step 408, the UE determines whether the UE is located within an area served by its serving AMF 106. In embodiments in which the registration accept includes information indicating a WSA area, the UE uses this WSA area information to determine whether the UE is located within an area served by its serving AMF. For example, in embodiments in which the information indicating the WSA area consists or comprises a set of TA identifiers, the UE determines whether the UE is located within an area served by the serving AMF by receiving a TA identifier from a serving AN node (e.g., base station) and determining whether the TA identifier received from the serving AN node is included in the WSA area (e.g. included in the set of one or more TA identifiers).

The UE is configured such that as a result of the UE deciding to initiate the connection and determining that the UE is not located within an area served by the serving AMF, the UE performs step 414 (i.e., the UE transmits a second registration request comprising registration type information indicating that the UE wants to perform a mobility registration update).

The UE is further configured such that as a result of the UE deciding to initiate the connection and determining that the UE is located within an area served by the serving AMF, the UE performs step 412 (i.e., the UE transmits towards the serving AMF a service request message).

In some embodiments, the UE is further configured such that: 1) as a result of the UE deciding to perform a periodic update and determining that the UE is not located within an area served by the serving AMF, the UE transmits a second registration request comprising registration type information indicating that the UE wants to perform a mobility registration update (i.e., step 414), and 2) as a result of the UE deciding to perform a periodic update and determining that the UE is located within an area served by the serving AMF, the UE transmits towards the serving AMF a second registration request comprising registration type information indicating that the UE wants to perform a periodic registration update (e.g., the UE is in registered state and initiates a registration procedure due to expiration of a periodic update timer) (i.e., step 418).

Figure 6:
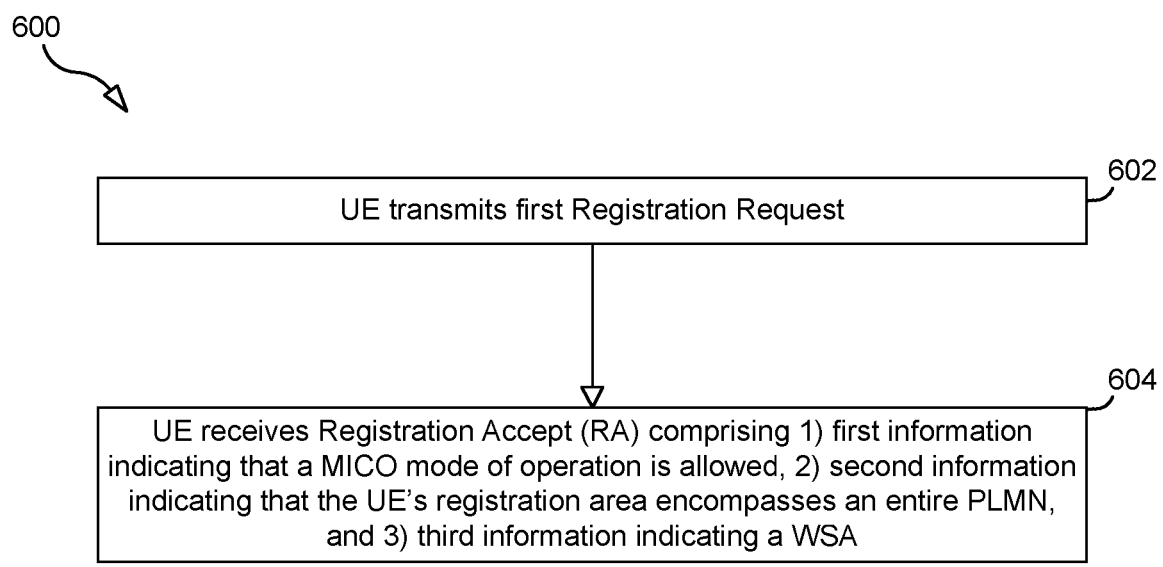
FIG. 6 is a flow chart illustrating a process according to some embodiments.

FIG. 6 is a flow chart illustrating a process 600 according to some embodiments. Process 600 may begin in step 602 in which the UE transmits a first access network (AN) message comprising a first registration request 551 comprising registration type information indicating that the UE wants to perform an initial registration or a registration update. In step 604, the UE receives a registration accept that is responsive to the registration request, wherein the registration accept was transmitted by a serving AMF and comprises: 1) first information indicating that the MICO mode of operation is allowed, 2) second information indicating that the UE's registration area encompasses an entire PLMN, and 3) third information indicating a Within Serving AMF (WSA) area (e.g., parts of a PLMN in which a periodic registration update and a service request procedures is possible to use).

Figure 7:
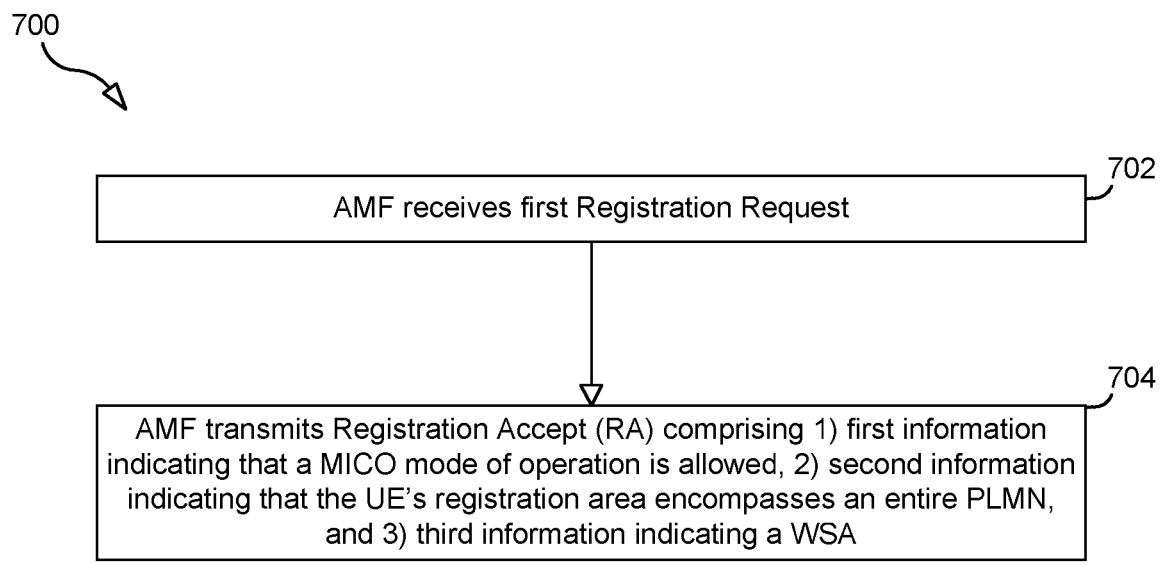
FIG. 7 is a flow chart illustrating a process according to some embodiments.

FIG. 7 is a flow chart illustrating a process 700 according to some embodiments. Process 700 may begin in step 702 in which the AMF 106 receives a first message (e.g., N2 message) comprising a first registration request 551 comprising registration type information indicating that a UE wants to perform an initial registration or a registration update. In step 704, the AMF transmits towards the UE a registration accept that is responsive to the registration request, wherein the registration accept comprises: 1) first information indicating that the MICO mode of operation is allowed, 2) second information indicating that the UE's registration area encompasses an entire PLMN, and 3) third information indicating a Within Serving AMF (WSA) area (e.g., parts of a PLMN in which a periodic registration update and a service request procedures is possible to use).

Figure 8:
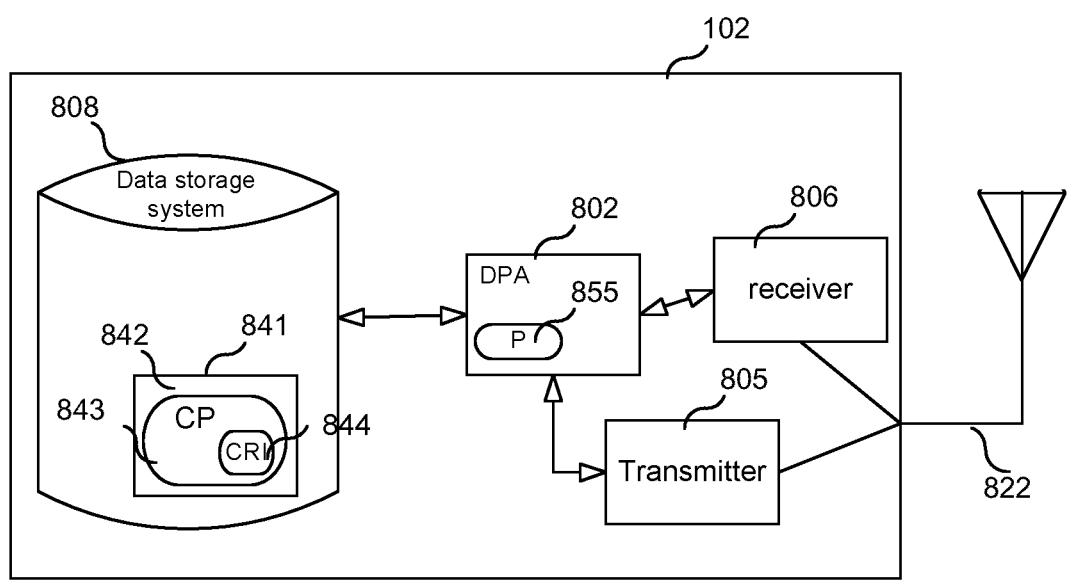
FIG. 8 is a block diagram of a UE according to some embodiments.

FIG. 8 is a block diagram of UE 102 according to some embodiments. As shown in FIG. 8, UE 102 may comprise: a data processing apparatus (DPA) 802, which may include one or more processors (P) 855 (e.g., a general purpose microprocessor and/or one or more other processors, such as an application specific integrated circuit (ASIC), field-programmable gate arrays (FPGAs), and the like); a transmitter 805 and a receiver 804 coupled to an antenna 822 for enabling UE 102 to transmit data to and receive data from an AN node (e.g., base station); and local storage unit (a.k.a., "data storage system") 808, which may include one or more non-volatile storage devices and/or one or more volatile storage devices (e.g., random access memory (RAM)). In embodiments where UE 102 includes a general purpose microprocessor, a computer program product (CPP) 841 may be provided. CPP 841 includes a computer readable medium (CRM) 842 storing a computer program (CP) 843 comprising computer readable instructions (CRI) 844. CRM 842 may be a non-transitory computer readable medium, such as, but not limited, to magnetic media (e.g., a hard disk), optical media, memory devices (e.g., random access memory, flash memory, etc.), and the like. In some embodiments, the CRI 844 of computer program 843 is configured such that when executed by data processing apparatus 802, the CRI causes UE 102 to perform steps described above (e.g., steps described above with reference to the flow charts). In other embodiments, UE 102 may be configured to perform steps described herein without the need for code. That is, for example, data processing apparatus 802 may consist merely of one or more ASICs. Hence, the features of the embodiments described herein may be implemented in hardware and/or software.

Figure 9:
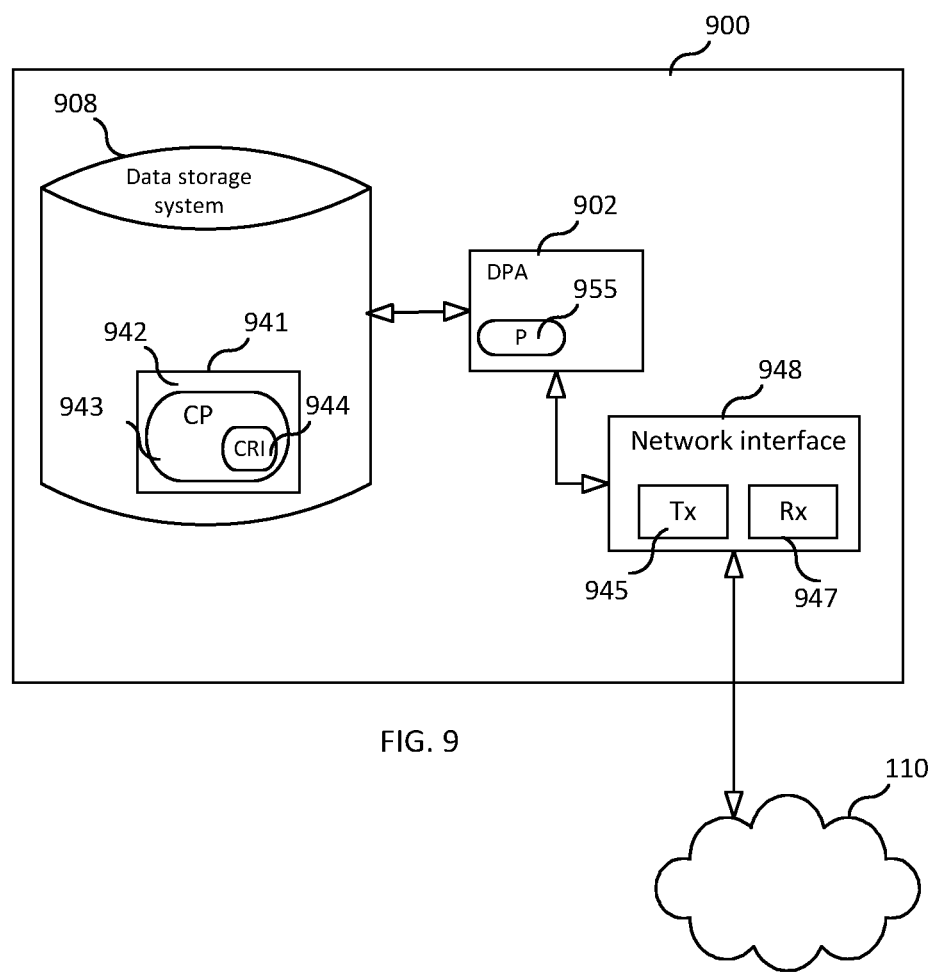
FIG. 9 is a block diagram of an apparatus for implementing an AMF according to some embodiments.

FIG. 9 is a block diagram of an apparatus 900, according to some embodiments, that may implement, among other things, AMF 106. As shown in FIG. 9, apparatus 900 may comprise: a data processing apparatus (DPA) 902, which may include one or more processors (P) 955 (e.g., a general purpose microprocessor and/or one or more other processors, such as an application specific integrated circuit (ASIC), field-programmable gate arrays (FPGAs), and the like); a network interface 948 comprising a transmitter (Tx) 945 and a receiver (Rx) 947 for enabling apparatus 900 to transmit data to and receive data from other nodes connected to a network 110 (e.g., an Internet Protocol (IP) network) to which network interface 948 is connected; and local storage unit (a.k.a., "data storage system") 908, which may include one or more non-volatile storage devices and/or one or more volatile storage devices (e.g., random access memory (RAM)). In embodiments where apparatus 900 includes a general purpose microprocessor, a computer program product (CPP) 941 may be provided. CPP 941 includes a computer readable medium (CRM) 942 storing a computer program (CP) 943 comprising computer readable instructions (CRI) 944. CRM 942 may be a non-transitory computer readable medium, such as, but not limited, to magnetic media (e.g., a hard disk), optical media, memory devices (e.g., random access memory, flash memory, etc.), and the like. In some embodiments, the CRI 944 of computer program 943 is configured such that when executed by data processing apparatus 902, the CRI causes apparatus 900 to perform steps described above (e.g., steps described above with reference to the flow charts). In other embodiments, apparatus 900 may be configured to perform steps described herein without the need for code. That is, for example, data processing apparatus 902 may consist merely of one or more ASICs. Hence, the features of the embodiments described herein may be implemented in hardware and/or software.

Figure 10:
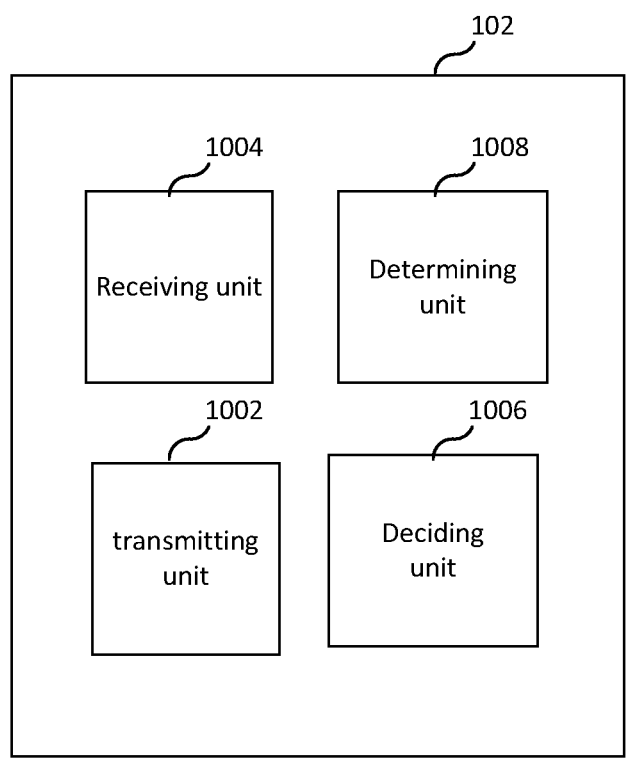
FIG. 10 is a diagram showing functional units of a UE according to some embodiments.

FIG. 10 is a diagram showing functional units of UE 102 according to some embodiments. As shown in FIG. 10, UE 102 includes a receiving unit 1004, a transmitting unit 1002, a deciding unit 1006 and a determining unit 1008. The transmitting unit 1002 is configured to employ transmitter 805 to transmit a first access network (AN) message comprising a first registration request comprising registration type information indicating that the UE wants to perform an initial registration or a registration update. The receiving unit 1004 is operable to employ receiver 804 to receive a registration accept that is responsive to the registration request, wherein the registration accept was transmitted by a serving AMF and comprises first information indicating that the MICO, mode of operation is allowed and second information indicating that the UE's registration area encompasses an entire PLMN. The deciding unit 1006 decides to initiate a connection or perform a periodic registration update. The determining unit 1008 is configured to determine whether the UE is located within an area served by the serving AMF. The transmitting unit 1002 is further configured, such that, as a result of the UE deciding to initiate the connection and determining that the UE is not located within an area served by the serving AMF, the transmitting unit employs the transmitter to transmit a second registration request comprising registration type information indicating that the UE wants to perform a mobility registration update. The transmitting unit 1002 is further configured, such that, as a result of the UE deciding to initiate the connection and determining that the UE is located within an area served by the serving AMF, the transmitting unit employs the transmitter to transmit towards the serving AMF a service request message.

Figure 11:
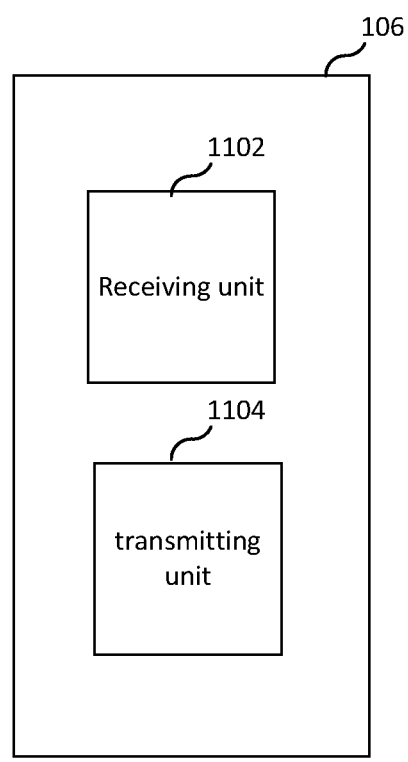
FIG. 11 is a diagram showing functional units of an AMF according to some embodiments.

FIG. 11 is a diagram showing functional units of AMF 106 according to some embodiments. As shown in FIG. 11, AMF 106 includes a receiving unit 1102 and a transmitting unit 1104. The receiving unit 1102 is configured to employee receiver 947 to receive a first message (e.g., N2 message) comprising a first registration request comprising registration type information indicating that a UE wants to perform an initial registration or a registration update. The transmitting unit 1104 is configured to employ transmitter 945 to transmit towards the UE a registration accept that is responsive to the registration request, wherein the registration accept comprises: 1) first information indicating that the MICO mode of operation is allowed, 2) second information indicating that the UE's registration area encompasses an entire PLMN, and 3) third information indicating a Within Serving AMF (WSA) area (e.g., parts of a PLMN in which a periodic registration update and a service request procedures is possible to use).

The present application claims priority to U.S. provisional application No. 62/469,074, filed on Mar. 9, 2017, which included an Appendix A. The relevant portion of that Appendix A is reproduced below:

1. Regarding registration area, for a UE in MICO mode, encompassing the whole PLMN In the SA2 meeting #119 it was decided that a UE in MICO mode may be assigned a registration area encompassing the whole PLMN, see TS 23.501 clause 5.4.1.3, which states: "The network, based on local policy, and subscription information, may decide to provide an "all PLMN" registration area indication to the UE. In that case, re-registration to the same PLMN due to mobility does not apply."

A purpose of assigning a registration area to a UE and requiring the UE to perform registration area updates when leaving that area, is to provide the network with a limited area in which to page the UE at MT events. In addition, a second purpose has been to allow a UE to request service by initiating the Service Request procedure with a minimum of parameters but still ensuring that the receiving core network node recognizes the UE, thus able to directly provide service to the UE without adding latency due to UE context fetch. For this purpose, it has been essential that the UE's complete registration area is served by the same AMF in which the UE is registered.

A third aspect of the registration area is the UE's periodic registration area update. Similarly, as for Service Request, it has for periodic registration area update been essential that the UE's complete registration area is served by the same AMF in which the UE is registered.

For a UE in MICO mode the registration area has not the same significance since such a UE is never paged. But with the possibility to assign a UE in MICO mode a registration area encompassing the whole PLMN there is a risk that a such a UE initiating a periodic registration area update or a Service Request will not be recognized by the receiving AMF as it is not always so that the whole PLMN is served by the AMF in which the UE is registered. In 3G and 4G a periodic registration area update or a Service Request from an unknown UE is considered as a failure case and the request is rejected whereby the UE is required to reattach. With the same method in 5G and a registration area encompassing a whole PLMN this situation will be more frequent and can no longer be regarded as a failure scenario. A solution is needed that doesn't require re-registration from the UE in MICO mode and to be able to accept the periodic registration area update or provide service to the UE, the new AMF must fetch the UE's context from the old AMF.

To be able to fetch UE context data from old AMF, the new AMF needs the identity of the old AMF. Due to a possible new AMF and a new set of available slices, more extensive security parameters and NSSAI are also needed. For a UE in MICO mode with a registration area encompassing the whole PLMN it is therefore proposed that the UE instead of using periodic registration area update or a Service Request, it shall use the Registration procedure as defined in TS 23.502 clause 4.2.2.2.2 whenever the UE in MICO mode wants to initiate connection with the core network and when there is a risk of addressing a new AMF. If the UE also wants to send user data it may include an Active flag in the request (similar as in 4G) and a list of PDU sessions to be setup or this may be performed by using a subsequent Service Request, see Editor's note in TS 23.502 clause 4.2.2.2.2., which states: "The possibility to piggyback a PDU session Establishment request at the same time as sending a Registration request is FFS."

Proposal 1:

A UE in MICO mode with a registration area encompassing the whole PLMN shall use the Registration procedure as specified in TS 23.502 clause 4.2.2.2.2 whenever the UE wants to initiate connection with the core network and when there is a risk of addressing a new AMF.

As the Registration procedure is a more extensive procedure compared to both the periodic registration area update and the Service Request procedures it would be good to decrease its use in areas where it is not needed i.e. in areas covered by the serving AMF. A way to do that would be to, in addition to the "all PLMN" indication, also provide the UE with a Within Serving AMF (WSA) area defined as an area in which the periodic registration area update and the Service Request procedures are still possible to use (due to that the serving AMF at least covers that area). The WSA area could be defined as a list of TAs or alternatively be define as the whole PLMN for cases when the service area of the serving AMF is the whole PLMN.

Proposal 2:

A UE in MICO mode with a registration area encompassing the whole PLMN shall be provided by a Within Serving AMF (WSA) area indicating an area in which the periodic registration area update and the Service Request procedures are possible to use. The WSA area is defined as a list of TAs within the PLMN or alternatively defined as the whole PLMN for cases when the service area of the serving AMF is the whole PLMN.

With proposal 1 the benefit of using the "all PLMN" as registration area is kept as the UE is not required to perform registration area updates during idle mode mobility in the PLMN while the drawbacks of possible reject and re-registration from the UE is avoided. By also adopting proposal 2 it is at the same time possible to decrease or remove the use of the more extensive registration area update procedure.

Regarding the Need to Provide a UE in MICO Mode with a Registration Area.

In TS 23.501 clause 5.4.1.3 there is the following editor's note, which states: "It is FFS whether AMF should provide a registration area to UE in MICO mode. If the registration area is provided, the registration area size may be bound to Mobility restrictions (i.e. the registration may be contained by the allowed area) and by requirements to perform tracking for the UE."

Within its registration area a UE is not required to initiate a registration are update procedure due to mobility. This means that as long a UE in MICO mode is within its registration area there may be no opportunity to renegotiate the MICO mode. Without providing a registration area to a UE in MICO mode, the UE will implicitly get a registration area not limited to just the serving PLMN. A MICO mode allowed to a UE by one operator (i.e. in serving PLMN) may then also be applied in other operator's network (i.e. other PLMN) without this operator able to influence the decision until the UE initiates a registration area update procedure. For that reason, it is proposed to always provide a UE in MICO mode with a registration area not spanning more than one PLMN.

Proposal 3:

A UE in MICO mode shall always be provided with a registration area. The registration area shall not span more than one PLMN.

Proposal 4:

Include the second part of the editor's note above as normative text, i.e. add the following as normative text:

The registration area is bound to Mobility restrictions (i.e. the registration may be contained by the allowed area) and by requirements to perform tracking for the UE.

Regarding MT Data for a UE in MICO Mode when UE is in CM-CONNECTED.

The following editor's note has been captured in TS 23.501 clause 5.4.1.3: "When the UE is in CM-CONNECTED after it has sent MO Data it is FFS how long the network needs to maintain the UE in CM-CONNECTED to enable delivery of MT Data from an application server and/or DL over NAS of SMS, location services etc."

After UL data has been sent by a UE in MICO mode the UE may at some occasions assume that a DL data response may be given. For those occasions the UE like to remain in CM-CONNECTED a while to enable delivery of the DL data. Depending on application the time it will take to deliver the DL data may vary and it is therefore proposed that the UE shall be able to indicate its preference for how long the network should maintain the UE in CM-CONNECTED. It is then up to the network to decide how long the UE remains in CM-CONNECTED.

Proposal 5:

A UE in MICO mode may indicate its preference for how long the network should maintain the UE in CM-CONNECTED. The network to decides how long the UE remains in CM-CONNECTED.

The following changes to the TS 23.501 are proposed.

5.4.1 UE Reachability in CM-IDLE 5.4.1.1 General

Reachability management is responsible for detecting whether the UE is reachable and providing UE location (i.e., access node) for the network to reach the UE. This is done by paging UE and UE location tracking. The UE location tracking includes both UE registration area tracking (i.e., UE registration area update) and UE reachability tracking ((i.e., UE periodic registration area update)). Such functionalities can be either located at 5GC (in case of CM-IDLE state) or 5G-RAN (in case of CM-CONNECTED state).

The UE and the AMF negotiate UE reachability characteristics in CM-IDLE state during registration and registration update procedures.

Two UE reachability categories are negotiated between UE and AMF for CM-IDLE state:

1. UE reachability allowing Mobile Terminated data while the UE is CM-IDLE mode.

The UE location is known by the network on a Tracking Area List granularity

Paging procedures apply to this category.

Mobile originating and mobile terminated data apply in this category for both CM-CONNECTED and CM-IDLE mode.

2. Mobile Initiated Connection Only (MICO) mode:

Mobile originated data applies in this category for both CM-CONNECTED and CM-IDLE mode.

Mobile terminated data is only supported when the UE is in CM-CONNECTED mode.

5.4.1.2 UE Reachability Allowing MICO Data while the UE is CM-IDLE 5.4.1.2.1 General Characteristics For this category, the UE reachability is determined by the following aspects:

The UE reachable time window: when the UE is reachable for paging in CM-IDLE. In the absence of any negotiation of UE reachable time window, the UE is assumed always reachable for paging while in CM-IDLE.

UE reachable area: This area is equal to the registration area provided by the AMF during initial registration or registration update procedures.

High latency communication: the handling of the mobile terminated data in the core network when the UE is unreachable for extended periods of time.

5.4.1.3 Mobile Initiated Connection Only (MICO) Mode

A UE may indicate preference for MICO mode during initial registration or registration update. The AMF, based on local configuration, UE indicated preferences, UE subscription information and network policies, or any combination of them, determines whether MICO mode is allowed for the UE and indicates it to the UE during Registration procedure.

The UE and core network re-initiates or exits the MICO mode at subsequent registration signalling. If MICO mode is not indicated explicitly in Registration, then both the UE and the AMF shall not use the MICO mode.

The AMF assigns a registration area to the UE during the registration procedure. The registration area is bound to Mobility restrictions (i.e. the registration may be contained by the allowed area) and by requirements to perform tracking for the UE. When the AMF indicates MICO mode to a UE, the registration area is not constrained by paging area size. The network, based on local policy, and subscription information, may decide to provide an "all PLMN" registration area indication to the UE. In that case, re-registration to the same PLMN due to mobility does not apply. A UE in MICO mode with a registration area encompassing the whole PLMN shall be provided with a Within Serving AMF (WSA) area indicating an area in which the periodic registration area update and the Service Request procedures are possible to use. The WSA area is defined as a list of TAs within the PLMN or alternatively define as the whole PLMN for cases when the service area of the serving AMF is the whole PLMN. Whenever a UE in MICO mode outside the provide WSA area wants to initiate connection with the core network the UE shall use the Registration procedure as specified in TS 23.502 clause 4.2.2.2.2.

When the AMF indicates MICO mode to a UE, the AMF considers the UE always unreachable while in CM-IDLE. The CN rejects any request for downlink data delivery for an MICO UE in idle mode. The CN also defers downlink transport over NAS for SMS, location services, etc. The UE in MICO mode is only reachable for mobile terminated data or signalling when the UE is in CM-CONNECTED mode. A UE in MICO mode may indicate its preference for how long the network should maintain the UE in CM-CONNECTED. The network decides how long the UE remains in CM-CONNECTED.

A UE in MICO mode performs periodic registration at the expiration of periodic registration timer.

A UE in MICO mode need not listen to paging while in CM-IDLE. A UE in MICO mode may stop any access stratum procedures in CM-IDLE, until the UE initiates CM-IDLE to CM-CONNECTED mode procedures due to one of the following triggers:

A change in the UE (e.g. change in configuration) requires an update its registration with the network.

Periodic registration timer expires.

MO data pending.

MO signalling pending (e.g. SM procedure initiated).

If a registration area that is not the "all PLMN" registration area is allocated to a UE in MICO mode, then the UE determines if it is within the registration area or not when it has MO data or MO signalling.

5.4.1.4 Mobile Deregistration at the End of Communication

A UE can perform deregistration at the end of communication without additional NAS signalling. The UE may indicate preference for the deregistration at the end of communication during registration procedure. The AMF determines whether it is supported for the UE, and indicates during the registration signalling. When the AMF applies the deregistration at the end of communication to the UE, the AMF considers the UE enters RM-DEREGISTERED at the release of N2 connection for the UE, and the UE moves to RM-DEREGISTERED when leaving CM-CONNECTED.

While various embodiments of the present disclosure are described herein (including the appendices, if any), it should be understood that they have been presented by way of example only, and not limitation. Thus, the breadth and scope of the present disclosure should not be limited by any of the above described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method performed by a user equipment (UE), the method comprising:
   the UE transmitting a first access network (AN) message comprising a first registration request comprising registration type information indicating that the UE wants to perform an initial registration or a registration update;
   the UE receiving a registration accept that is responsive to the registration request, wherein the registration accept was transmitted by a serving access and mobility management function (AMF) and comprises first information indicating that a Mobile Initiated Connection Only (MICO) mode of operation is allowed and second information indicating that the UE's registration area encompasses an entire public land mobile network (PLMN);
   the UE deciding to initiate a connection or perform a periodic registration update; and
   the UE determining whether the UE is located within an area served by the serving AMF, wherein the UE is configured such that:
   i) as a result of the UE deciding to initiate the connection and determining that the UE is not located within an area served by the serving AMF, the UE transmits a second registration request comprising registration type information indicating that the UE wants to perform a mobility registration update, and
   ii) as a result of the UE deciding to initiate the connection and determining that the UE is located within an area served by the serving AMF, the UE transmits towards the serving AMF a service request message.

2. The method of claim 1, wherein the UE is further configured such that:
   iii) as a result of the UE deciding to perform a periodic update and determining that the UE is not located within an area served by the serving AMF, the UE transmits a second registration request comprising registration type information indicating that the UE wants to perform a mobility registration update, and
   iv) as a result of the UE deciding to perform a periodic update and determining that the UE is located within an area served by the serving AMF, the UE transmits towards the serving AMF a second registration request comprising registration type information indicating that the UE wants to perform a periodic registration update (e.g., the UE is in registered state and initiates a registration procedure due to expiration of a periodic update timer).

3. The method of claim 1, wherein the registration accept further comprises third information indicating a Within Serving AMF (WSA) area.

4. The method of claim 3, wherein the information indicating the WSA area a) comprises or consists of a set of one or more tracking area, TA, identifiers or b) indicates the entire PLMN.

5. A method performed by a user equipment (UE), the method comprising:
   the UE transmitting a first access network (AN) message comprising a first registration request comprising registration type information indicating that the UE wants to perform an initial registration or a registration update; and
   the UE receiving a registration accept that is responsive to the registration request, wherein the registration accept was transmitted by a serving access and mobility management function (AMF) and comprises: 1) first information indicating that a Mobile Initiated Connection Only (MICO) mode of operation is allowed, 2) second information indicating that the UE's registration area encompasses an entire PLMN, and 3) third information indicating a Within Serving AMF (WSA) area, wherein the WSA area specifies the areas served by the AMF; and
   the UE determining, based on the indicated WSA area and the UE's current location, whether or not to refrain from transmitting a Service Request.

6. The method of claim 5, wherein the information indicating the WSA area a) comprises or consists of a set of one or more tracking area (TA) identifiers or b) indicates the entire PLMN.

7. The method of claim 6, wherein the UE determines whether the UE is located within an area served by the serving AMF by receiving a TA identifier from a serving AN node and determining whether the TA identifier received from the serving AN node is included in the WSA area.

8. A user equipment, UE, the UE being configured to perform the method of claim 1.

9. A user equipment (UE), the UE comprising:
   a receiver;
   a transmitter; and
   a data processing apparatus, wherein the UE is operable to:
   transmit a first access network (AN) message comprising a first registration request comprising registration type information indicating that the UE wants to perform an initial registration or a registration update;
   receive a registration accept that is responsive to the registration request, wherein the registration accept was transmitted by a serving access and mobility management function (AMF) and comprises first information indicating that a Mobile Initiated Connection Only (MICO) mode of operation is allowed and second information indicating that the UE's registration area encompasses an entire PLMN;
   decide to initiate a connection or perform a periodic registration update; and
   determine whether the UE is located within an area served by the serving AMF, wherein the UE is configured such that:
   i) as a result of the UE deciding to initiate the connection and determining that the UE is not located within an area served by the serving AMF, the UE transmits a second registration request comprising registration type information indicating that the UE wants to perform a mobility registration update, and
   ii) as a result of the UE deciding to initiate the connection and determining that the UE is located within an area served by the serving AMF, the UE transmits towards the serving AMF a service request message.

10. The UE of claim 9, wherein the UE is further configured such that:
    iii) as a result of the UE deciding to perform a periodic update and determining that the UE is not located within an area served by the serving AMF, the UE transmits a second registration request comprising registration type information indicating that the UE wants to perform a mobility registration update, and iv) as a result of the UE deciding to perform a periodic update and determining that the UE is located within an area served by the serving AMF, the UE transmits towards the serving AMF a second registration request comprising registration type information indicating that the UE wants to perform a periodic registration update.

11. The UE of claim 9, wherein the registration accept further comprises third information indicating a Within Serving AMF (WSA) area.

12. The UE of claim 11, wherein the information indicating the WSA area a) comprises or consists of a set of one or more tracking area (TA) identifiers or b) indicates the entire PLMN.

13. A user equipment (UE), the UE comprising:
a receiver;
a transmitter; and
a data processing apparatus, wherein the UE is operable to:
transmit a first access network (AN) message comprising a first registration request comprising registration type information indicating that the UE wants to perform an initial registration or a registration update;
receive a registration accept that is responsive to the registration request, wherein the registration accept was transmitted by a serving access and mobility management function (AMF) and comprises: 1) first information indicating that a Mobile Initiated Connection Only (MICO) mode of operation is allowed, 2) second information indicating that the UE's registration area encompasses an entire PLMN, and 3) third information indicating a Within Serving AMF, WSA, (WSA) area, wherein the WSA area specifies the areas served by the AMF; and
determine, based on the indicated WSA area and the UE's current location, whether or not to refrain from transmitting a Service Request.

14. The UE of claim 13, wherein the information indicating the WSA area a) comprises or consists of a set of one or more tracking area (TA) identifiers or b) indicates the entire PLMN.

15. The UE of claim 14, wherein the UE is configured to determine whether the UE is located within an area served by the serving AMF by performing a process comprising: receiving a TA identifier from a serving AN node and determining whether the TA identifier received from the serving AN node is included in the WSA area.

16. A method performed by an access and mobility management function (AMF), the method comprising:
the AMF receiving a first message comprising a first registration request comprising registration type information indicating that a user equipment (UE) wants to perform an initial registration or a registration update; and
the AMF, transmitting towards the UE a registration accept that is responsive to the registration request, wherein the registration accept comprises: 1) first information indicating that a Mobile Initiated Connection Only (MICO) mode of operation is allowed, 2) second information indicating that the UE's registration area encompasses an entire PLMN, and 3) third information indicating a Within Serving AMF (WSA) area, wherein the WSA area specifies the areas served by the AMF, and the UE is configured such that the UE determines, based on the indicated WSA area and the UE's current location, whether or not to refrain from transmitting a Service Request.

17. The method of claim 16, wherein the information indicating the WSA area a) comprises or consists of a set of one or more tracking area (TA) identifiers or b) indicates the entire PLMN.

18. The method of claim 16, wherein the first message is an N2 message.

19. An apparatus implementing an access and mobility management function, AMF, the apparatus being adapted to perform the method of claim 16.

20. An apparatus implementing an access and mobility management function (AMF), the apparatus comprising:
a receiver for receiving a first message comprising a first registration request comprising registration type information indicating that a user equipment (UE) wants to perform an initial registration or a registration update; and
a transmitter for transmitting towards the UE a registration accept that is responsive to the registration request, wherein the registration accept comprises: 1) first information indicating that a Mobile Initiated Connection Only (MICO) mode of operation is allowed, 2) second information indicating that the UE's registration area encompasses an entire PLMN, and 3) third information indicating a Within Serving AMF (WSA) area, wherein the WSA area specifies the areas served by the AMF, and the UE is configured such that the UE determines, based on the indicated WSA area and the UE's current location, whether or not to refrain from transmitting a Service Request.

* * * * *